United States Patent [19]

Lee et al.

[11] Patent Number: 5,734,420
[45] Date of Patent: Mar. 31, 1998

[54] FILM MODE VIDEO SEQUENCE DETECTOR

[75] Inventors: Young Sun Lee; Jin Hwan Lee; Yo Sung Ho; Joo Hong Jeong, all of Daejeon, Rep. of Korea

[73] Assignee: Electronics and Telecommunications Research Institute, Daejeon, Rep. of Korea

[21] Appl. No.: 572,268

[22] Filed: Dec. 13, 1995

[30] Foreign Application Priority Data

Dec. 13, 1994 [KR] Rep. of Korea ............... 1994-34003

[51] Int. Cl.⁶ .................................................... H04N 7/18
[52] U.S. Cl. .......................................... 348/97; 348/441
[58] Field of Search ............................ 348/97, 104, 96, 348/449, 441; H04N 7/18

[56] References Cited

U.S. PATENT DOCUMENTS

| | | | |
|---|---|---|---|
| 4,982,280 | 1/1991 | Lyon et al. | 348/97 |
| 5,317,398 | 5/1994 | Casavant et al. | 348/97 |
| 5,365,273 | 11/1994 | Correa et al. | 348/449 |
| 5,563,651 | 10/1996 | Christopher et al. | 348/97 |

*Primary Examiner*—Bryan S. Tung
*Attorney, Agent, or Firm*—Jacobson, Price, Holman & Stern, PLLC

[57] ABSTRACT

A film mode video sequence detector for detecting video sequences converted from movie films in 30 Hz frame rate video resources comprises a video signal detecting means provided a mean of absolute difference (MAD) value of input video signal and a film mode condition generation signal considering a user threshold and still picture, making a decision whether the input signal is film mode, and transmitting the film mode condition generation signal, film mode departure signal, the threshold pass signal, and a clock which is generated on film mode condition; a condition generating means provided the MAD value and the condition generating signal from the video mode detecting means, making a decision whether the MAD value shows a pattern off film mode considering still picture, transmitting the film mode condition generating signal to the video signal detecting means; a mode converting means provided an input field decision signal, a screen transition generating signal, departure signal from video mode decision means, a threshold pass signal, and a generating film mode departure signal considering screen transition; a video mode decision means film mode departure signal from the mode converting means, clock when the signal from the video signal detecting means is film mode; and a video mode decision means being provided a user threshold and a transmitting video mode generating signal.

7 Claims, 5 Drawing Sheets

[5,734,420]

FILM MODE VIDEO SEQUENCE DETECTOR

BACKGROUND OF THE INVENTION

1. Technical Field

The present invention relates to a film mode video sequence detector, and especially relates to a film mode video sequence detector detecting video sequences converted from movie films in 30 Hz frame rate video resources which is supplied to digital video encoder using MPEG-2 (Moving Picture Experts Group-2), a standard compression method.

2. Prior Art

Generally, since MPEG algorithm can support various frame rates (24/25/29, 97/30/50/59, 94/60), video resources having different frame rates are operated without adjustment. For example, movie films which consist of broadcasting program source is converted to 30 Hz by using telecine equipment and broadcasted on a NTSC broadcasting system. However, they can be encoded directly at 24 Hz by digital video encoder and broadcasted. Accordingly, film mode video sequence provided at 30 Hz would rather be encoded after it is converted into the film mode which is at 24 Hz, than it is at 30 Hz. This can make the quality higher.

Therefore, an object of the present invention is to provide a film mode video sequence detector detecting whether video sequence is converted from movie film or not, and transmitting the detecting result to an encoder for being able to encode the video sequences to 24 Hz.

SUMMARY OF THE INVENTION

Therefore, for attaining the aforementioned objection, the present invention comprises a video signal detecting means provided mean of absolute difference (HAD) value of input video signal and film mode condition generation signal by considering a user threshold and still picture, making a decision whether the input signal is film mode, and transmitting the film mode condition generation signal, film mode departure signal, threshold pass signal, and a clock which is generated on film mode condition;

a condition generating means provided the HAD value and condition generating signal from the video mode detecting means, making a decision whether the HAD value shows a pattern of film mode by considering still picture, transmitting the film mode condition generating signal to the video signal detecting means; a mode converting means provided an input field decision signal, a screen transition generating signal, a departure signal from video mode decision means, a threshold pass signal, and a generating film mode departure signal by considering screen transition;

a video mode decision means film mode departure signal from the mode converting means, a clock when the signal from the video signal detecting means is film mode; and a video mode decision means provided an user threshold and transmitting video mode generating signal.

BRIEF DESCRIPTION OF THE DRAWINGS

The present invention will be described in more detail below by way of example with the aid of the drawings.

DETAILED DESCRIPTION

A preferred embodiment of the present invention will now be described with reference to the accompanying drawings.

A method of distinction between video sequences at 30 Hz which are converted from movie film, and video sequence made by a video camera; detects regular elements of video sequences generated by 3:2 pull-down processing. Telecine, which is an equipment for converting movie available at 24 Hz film for television display, converts the frame rate into video sequences available at 30 Hz by using 3:2 pull-down processing.

3:2 pull-down processing is a method converting two field frame, odd and even, into three field frame, odd, even, and odd, or, even, odd, and even. The telecine performs 3:2 pull-down processing twice every four frames. Thus, 12 field video sequences are made per second, and 24 Hz video sequence is converted into 30 Hz video sequence.

Therefore, video sequences, which are converted from film by using telecine, include regular elements due to 3:2 pull-down processing. There is little difference between adjecent fields in moving picture sequences, if the picture sequence fields are repeated according to 3:2 pull-down processing. However, there is a lot of difference if the picture sequence fields aren't repeated.

Accordingly, MAD (Mean of Absolute Difference) is used as a basis on computing the similarities between fields in the present invention. The equation for MAD is shown below:

$$MAD = \frac{1}{N} \sum_{n=0}^{N-1} |F_i(n) - F_{i-1}(n)|$$

Wherein, N is the number of total pixcels in a field, $F_i$ is the current field, and $F_{i-1}$ is the field which has the same parity as $F_i$ in the previous screen.

Since frame rates of film source video sequences are converted by 3:2 pull-down processing, MAD calculated every five fields has the form "small, large, large, large, large, small, large, large, large, large, small, large, ...". "small, large, large, large, large" is called a film mode pattern in this inventor. It is determined whether the video sequences are converted front film, if they have the film mode pattern.

On the other side, video mode sequences can be edited by the field while film mode sequences can be edited by the frame in a progressive scanning film. Therefore, when the film source is converted by telecine, video sequences have the film mode pattern before editing, but there are some cases that have no film mode pattern after editing.

The present invention, provides methods for detecting film mode video sequences and adjusting video sequences back to 24 Hz, considering editing and still picture in 30 Hz video mode.

Figure 1:
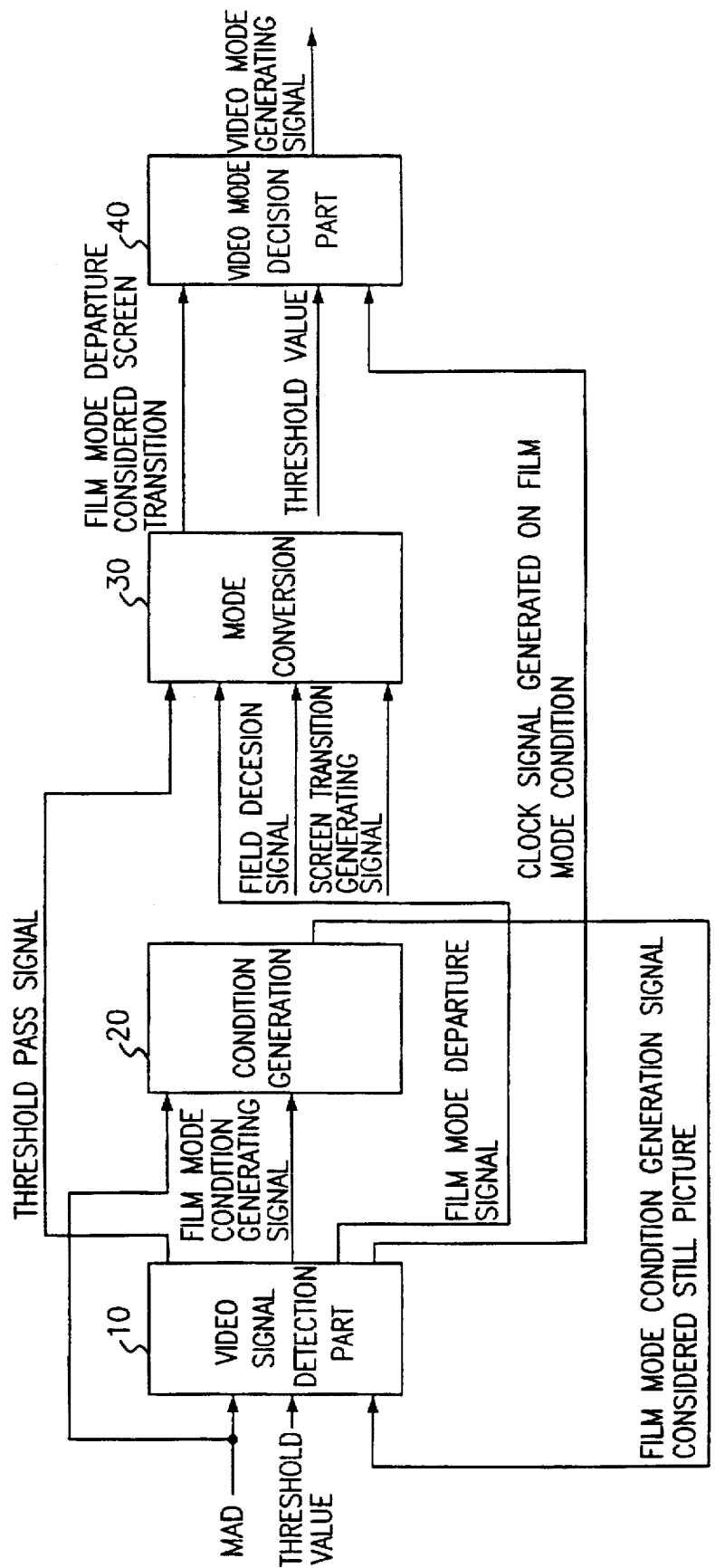
FIG. 1 is a block diagram illustrating film mode video sequence detector in accordance with the present invention.

FIG. 1 shows a block diagram illustrating an embodiment of film mode video sequence detector in accordance with the present invention. Each user_define threshold value, which user can define the threshold value, is applied to the video signal detecting part 10 and the video mode decision part 40.

Since MAD in the film mode has a pattern "small, large, large, large, large", the video signal detecting part 10 compares the input MAD value with the user_define threshold value and provides the mode conversion part 30 with a high level threshold pass signal when the input MAD value is small.

When the input MAD value is a value correspoding to a film mode, the condition generating part 20 which uses a film mode condition generating signal which is outputted from the video signal detecting part 10 as an enable signal, when input MAD value is correspoding to a film mode by considering still picture, generates film mode condition generating signal (hereinafter, referred to film mode signal) by considering high level still pictures and provides the film mode signal to the video signal detecting part 10.

Moreover, when the input MAD values are "small, large, large, large, large", of values by considering still picture, the clock signal generated when the film mode keeps high for one field out of every five fields, is fed to the video mode detecting part 40. When the input MAD value is different from that of the film mode, a high level film mode departure signal is fed to mode conversion part 30.

On the other side, when screen transition have occurred, it must come out of the film mode. Therefore, the mode conversion part 30 is provided with field decision signal and the screen transition generation signal, according to the threshold value pass signal and the film mode departure signal generated from the video signal detecting part 10, and determines whether screen transition has occurred or not. When screen transition has occurred or film mode departure is fed, the mode conversion part 30 makes counter in video mode decision curcult 40 reset, and sets the output signal high. The video mode decision part 40 operates the counter by using the clock which is generated in case the input signal is film mode generated from the video mode detecting part 10, and compares the output value of the counter with a non_determined threshold value by the film mode departure signal from mode conversion part 30 as a reset signal. If the output value of the counter is larger than the threshold value, it is considered as a film mode and high level video mode generation signal is outputted.

Figure 2:
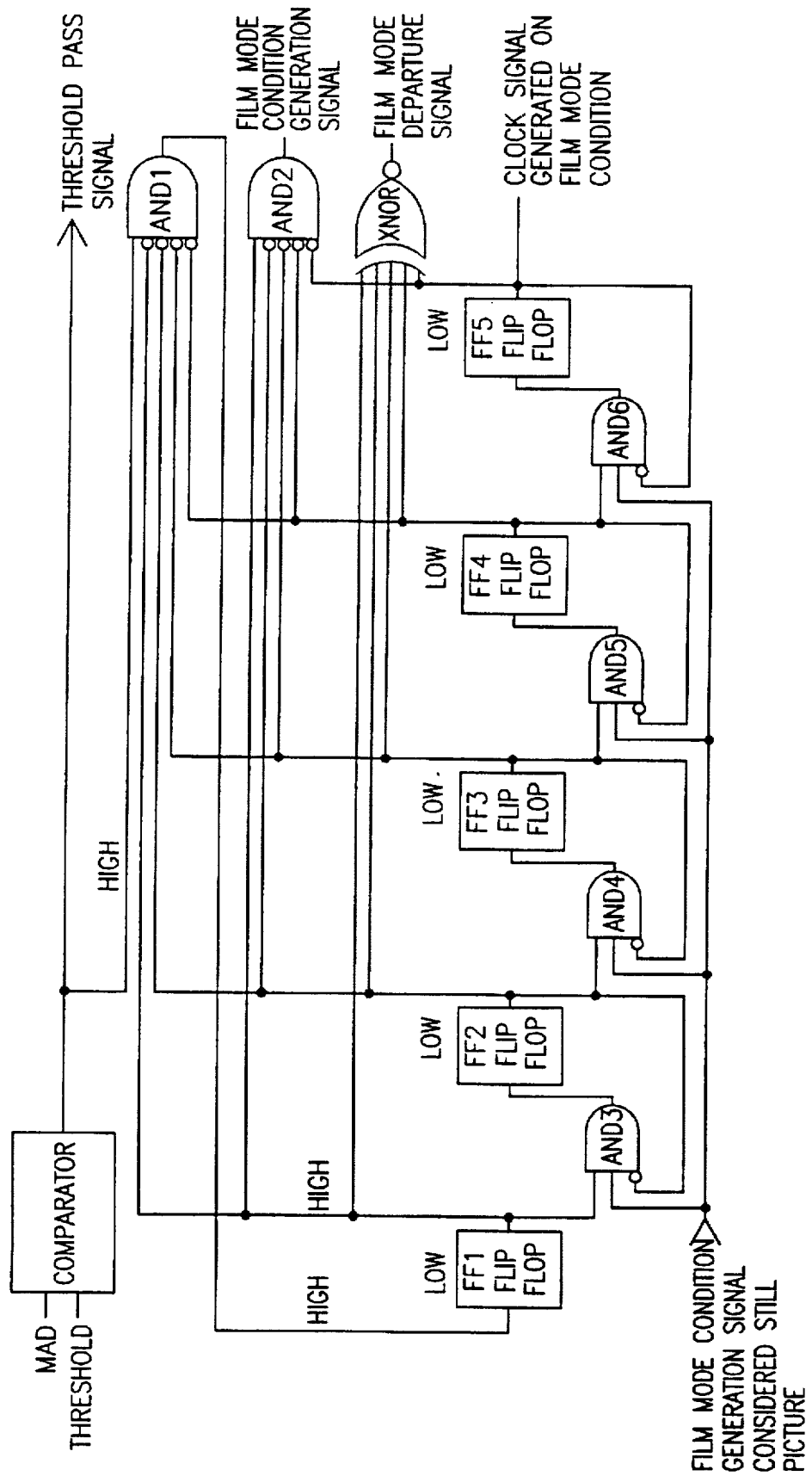
FIG. 2 is a diagram illustrating the video sequence detection part of FIG. 1 in detail.

FIG. 2 shows in detail a diagram of the video sequence detecting part in FIG. 1. In the FIG. 2, every filpflop has a period of one field and originally outputs low level.

Since the MAD value of film mode video sequence is "small, large, large, large, large, small, large, large, large, large ...", the comparator 11 compares the MAD value with the threshold. If the input MAD value is smaller than the threhold value, i.e. the input value is small, the comparator 11 provides the mode conversion part 30 with threshold pass signal, wherein the threshold value is predetermined in order to determine whether the input value is "small" or "large".

The AND operation gate AND1 outputs high level signal, which informs the filpflop FF1 of the start of the film mode sequence, when each output signal of the filpflops FF1, FF2, FF3, and FF4 are low and the threshold pass signal is high. The AND operation gate AND2 provides the condition generating part 20 with high level film mode signal, when the output signal of the flipflop FF1 is high and each output signal of the others FF2, FF3, FF4, and FF5 is low.

On the other side, the high level film mode signal outputted from the condition generating part 20 is supplied to the video signal detecting part 10 when the signal is a film mode. The AND operation gate AND3 provides the flipflop FF2 with a high level signal when the output signal of the flipflop FF1 and film mode signal are high, and output signal of the flipflop FF2 is low, wherein the flipflop FF2 outputs a high level signal for one clock.

The AND operation gate AND4 provides the flipflop FF3 with a high level signal when the output signal of the flipflop FF2 and the film mode signal are high, and the output signal of the flipflop FF3 is low, wherein the flipflop FF3 outputs a high level signal for one clock.

Moreover, the AND operation gate AND5 provides the flipflop FF4 with a high level signal when the output signal of the flipflop FF3 and the film mode signal are high and the output signal of the flipflop FF4 is low, wherein the flipflop FF4 outputs a high level signal for one clock.

Similarly, the AND operation gate AND6 provides the flipflop FF5 with a high level signal when the output signal of the flipflop FF4 and the film mode signal are high and the output signal of the flipflop FF5 is low, wherein the flipflop FF4 outputs a high level signal for one clock. In other words, if the input sequences are film mode continuously, the flipflop FF5 provides the video mode decision part 40 with a clock signal which is generated in the film mode, for one clock every five field.

Since the outputs of the flipflops FF1, FF2, FF3, FF4, and FF5 become high for one clock successively when the input signal is a normal film mode, the XNOR operation gate (XNOR) provides the mode conversion part 30 with a high level film mode departure signal when each output signal of the flipflops is abnormal, i.e. it is not film mode.

Figure 3:
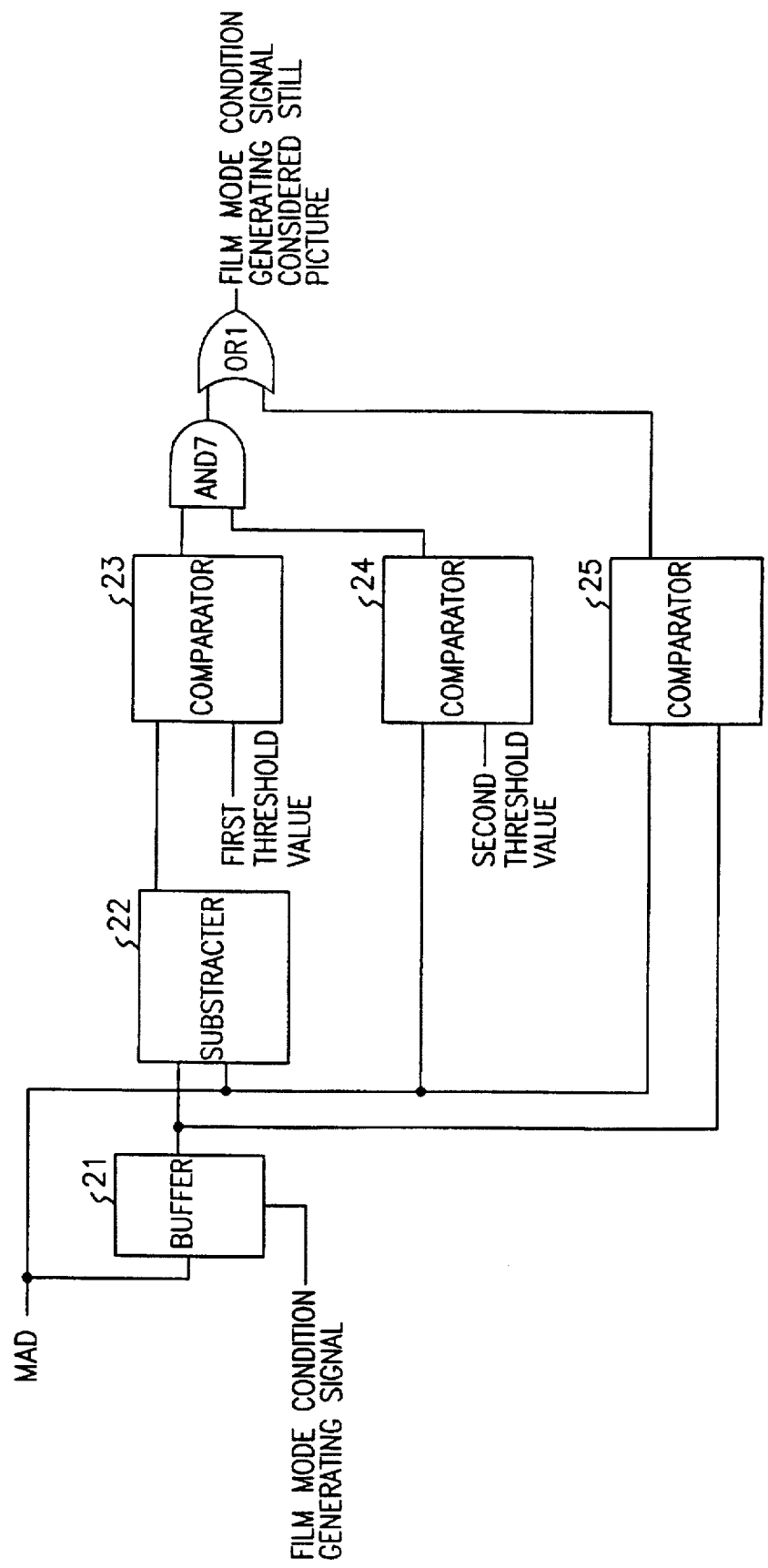
FIG. 3 is a block diagram illustrating a concrete arrangement of condition generation part of FIG. 1.

FIG. 3 shows a block diagram of the condition generating part 20 of FIG. 1 in detail.

Since the MAD value of a normal film mode signal is "small, large, large, large, large, small, large, large, large, large ... ", if the value of repeated "large" after "small" is larger than the latest "small", the value is satisfied with a condition of film mode. In other words, when the value of MAD is "small", the video signal detecting part 10 outputs a high level film mode signal, wherein the MAD value of "small" is stored in the buffer 21.

A comparator 25 compares the input MAD value with the output signal of the buffer 21 and outputs a high level signal when the MAD value is larger than the output signal of the buffer 21.

However, since the MAD value is "small, small, small, small, small, ... " in the case of a still picture, the difference of the value of repetition "small" from that of the first "small" must be less than a first threshold value. Each value of the repeated "small" must be less than a second threshold value for satisfying the film mode condition. In other words, a subtracter 22 outputs the output of the buffer 21 corresponding to the first "small" and the MAD value of repeated "small", the comparator 23 compares the output of the subtracter 22 with a first threshold value and outputs a high level signal when the output of the subtracter 22 is less than the first threshold value.

Moreover, the comparator 24 compares the MAD value of repetition "small" with a second threshold value and outputs a high level signal when the output of the subtracter 22 is larger than a second threshold value. Therefore, the AND operation gate AND7 outputs a high level signal when both the outputs of comparators 23, 24 are high.

Finally, the OR operation gate OR1 outputs the condition generating signal, considered still pictures, when both the outputs of the AND operation gate AND7 and the comparator 25 are high, which is satisfied with the film mode condition.

Figure 4:
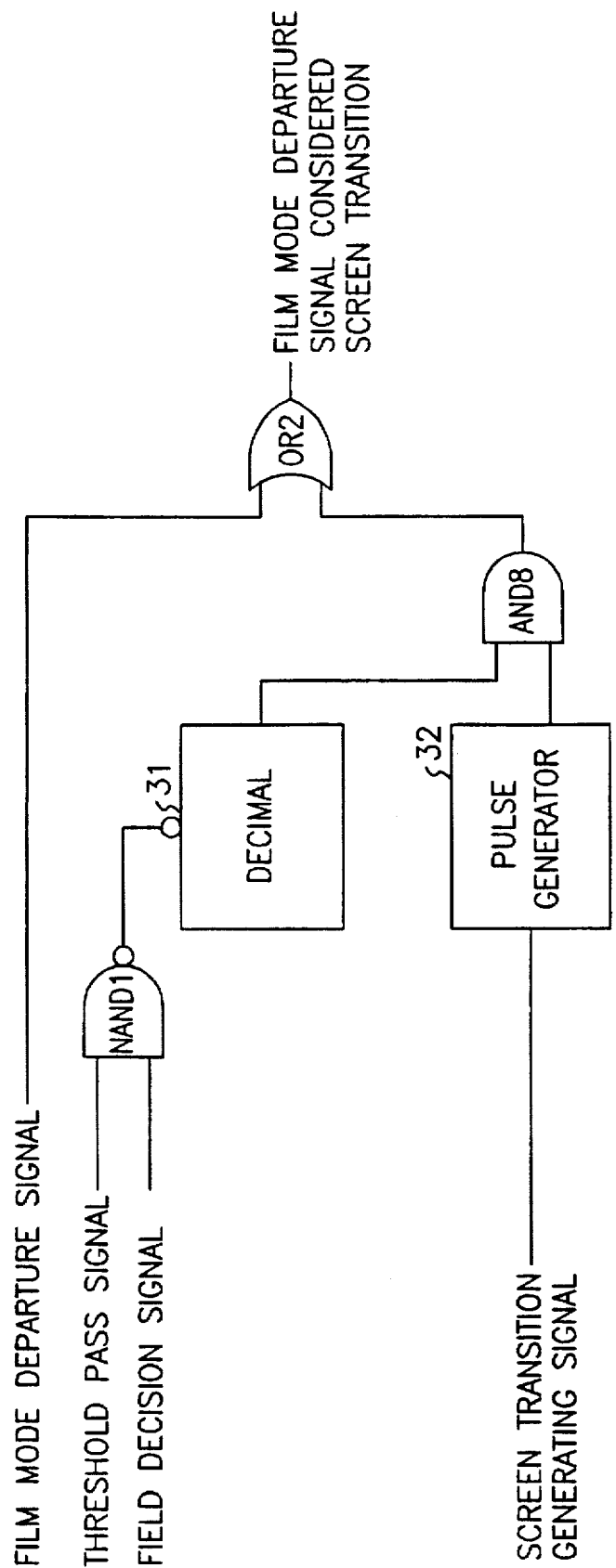
FIG. 4 is a block diagram illustrating a concrete arrangement of mode conversion part.

FIG. 4 shows the mode conversion part of FIG. 1 in detail. Since the MAD value of the video signal is small (odd field) <1>, large (even field) <2>, large (odd field) <3>, large (even field) <4>, large (odd field) <5>, small (even field) <6>, large (odd field) <7>, large (even field) <8>, large (odd field) <9>, large (even field) <10> . . . , screen transition can occur at <3>, <5>, <10> when the film mode video sequences are edited at 30 Hz video mode. When the video sequences are decoded by a decoder at the video mode, after they are encoded at the film mode, in must escape from the film mode immediately because the previous field is displayed after the screen transition.

Therefore, if both signals are high, the threshold pass signal inputted from the video signal detecting part 10 and the field identification signal which is an odd field, it is small (odd field) <1>. Thus, the output signal of the NAND gate NAND1 is used as a reset signal of decimal counter 31 which outputs a high level signal when the value of counter is 2, 4, and 9.

On the other hand, if the pulse generator 32 receives a screen transition signal which is high level during screen transition, then it generates one clock which keeps high level during one field. The pulse signal is logically produced with the output of the decimal counter 31 on the AND gate AND8, then the AND gate AND8 outputs a high level signal when both the output of the decimal counter 31 and the output of the pulse generator 32 are high.

Thus, the OR gate OR2 generates a film mode departure signal and makes it come out of film mode when the output of the AND gate AND8, or the film mode departure signal from the video signal generation part 10, is high.

Figure 5:
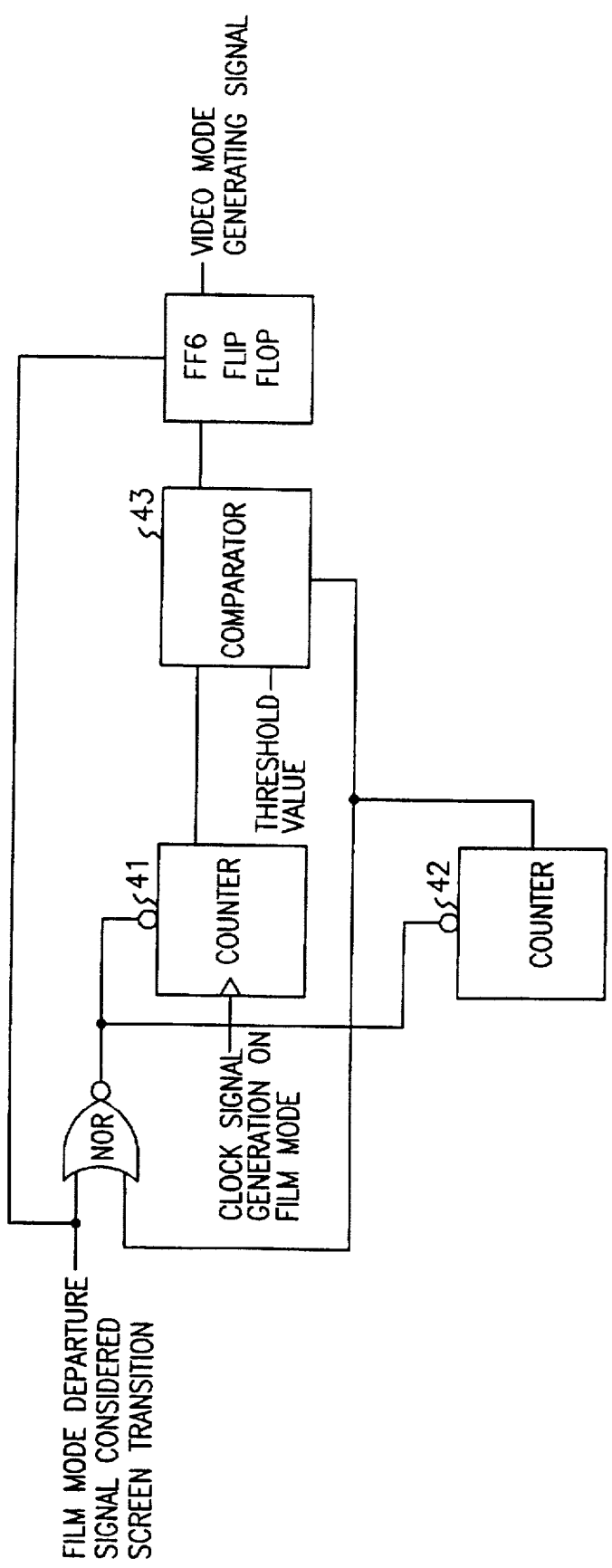
FIG. 5 is a block diagram illustrating a concrete arrangement of video mode decision part of FIG. 1.

FIG. 5 shows the video mode decision part of FIG. 1 in detail. The counter 42 increasing +1 for each field outputs signal which keeps high level for one field at the last value of the counter. Capacity of the counter is determined by the film mode detecting time. For example, if it wants to be determined whether it is a film mode, after 1 minute detection, the capacity of the counter 42 must be 60 seconds×60 field, i.e. 3600 counter.

The NOR gate NOR generates a low level signal and resets the counters 41 and 42, when the film mode departure signal, by considering screen transition outputted from the mode conversion part 30 or output signal of the counter 42, is high level.

The counter 41 outputs +1 increased signal per five fields by a film mode condition signal ouputted from the video signal detecting part 10. Therefore, the comparator 43 compares the output signal of the counter 42, when it is high level, with the threshold. If it is larger than the threshold, then the comparator outputs a high level signal.

The flipflop FF6, if the output of the comparator 43 is high level, outputs a high level signal, which indicates it is film mode. If the output of the comparator 43 is low level, or the film mode departure signal by considering the secreen transition is high level, then outputs a low level signal, which indicates the video mode.

As the discussed above, the present invention detects the video sequence translated from the film in the video resource which is inputted at 30 Hz, so that the 30 Hz/s video sequence can be converted into 24 Hz/s video sequence, which can reduce frames to be encoded at 20%. This can improve the encoding efficiency of the digital video encoder.

What is claimed is:

1. A film mode video sequence detector comprising:
   a video signal detecting means provided with a mean of absolute difference (MAD) value of an input video signal, a threshold value defined by a user, and a film mode condition generation signal by considering a still picture, for making a decision whether the input video signal is in film mode, and for transmitting the film mode condition generation signal, a film mode departure signal, a threshold pass signal, and a clock signal which is generated in the film mode:
   a condition generating means provided with the MAD value and the film mode condition generation signal from the video signal detecting means, for transmitting the film mode condition generation signal by considering the still picture to the video signal detecting means;
   a mode converting means provided with an input field decision signal, a screen transition generating signal, and the film mode departure signal and the threshold pass signal outputted from said video signal detecting means, for generating the film mode departure signal by considering screen transition; and
   a mode decision means provided with the film mode departure signal outputted from said mode converting means by considering the screen transition, the clock signal when the video signal detecting means is in the film mode, and the threshold value defined by the user, for transmitting a mode generating signal.

2. A film mode video sequence detector as defined in claim 1, wherein said video signal detecting means generates the threshold pass signal when the MAD value is smaller than the threshold value.

3. A film mode video sequence detector as defined in claim 1, wherein said video signal detecting means decides whether a pattern of said MAD value signifies a film mode or a video mode, generates a film mode condition generation signal if the pattern of said MAD value signifies a film mode, and generates a departure signal if the pattern of said MAD value signifies a video mode.

4. A film mode video sequence detector as defined in claim 1, wherein said video signal detecting means generates the clock signal at the film mode, which keeps a high level for one clock per five fields, if a film mode signal is inputted continuously.

5. A film mode video sequence detector, as defined in claim 1, wherein said condition generating means comprises:
   a buffering means for storing the MAD value according to the film mode condition generation signal outputted from said video signal detecting means;
   subtracting means for outputting the difference between the output of said buffering means corresponding to a first "small" MAD value and the MAD value corresponding to a continuously inputted "small" MAD value;
   a first comparing means for comparing the output of said subtracting means with a first threshold value;
   a second comparing means for comparing said MAD value corresponding to the continuously inputted "small" MAD value with a second threshold value;
   a logical AND operating means for logically AND operating the outputs of said first and second comparing means;
   a third comparing means for comparing said MAD value with the output signal of said buffering means; and
   a logical OR operating means for logically OR operating the output signal of said logical AND operating means and the output signal of said third comparing means.

6. A film mode video sequence detector as defined in claim 1, wherein said mode converting means comprises:
   a counter for using a logically NANDed signal of the threshold pass signal outputted from said video signal detecting means and the field decision signal as a reset signal, and for outputting a high level signal when the counter's value is 2, 4 and 9;

a pulse generating means for generating a clock signal, during a screen transition according to the screen transition generating signal;

a logical AND operating means for logically AND operating an output pulse signal outputted from said pulse generating means and the output signal of said counter; and a logical OR operating means for logically OR operating the output signal of said logical AND operating means and the film mode departure signal outputted from said video signal detecting means, and for outputting the film mode departure signal by considering the screen transition.

7. A film mode video sequence detector as defined in claim 1, wherein said video mode decision means comprises:

a first counter for outputting increased value by +1 when one field of the video signal is inputted;

a logical NOR operating means for logically NOR operating the film mode departure signal outputted from said mode converting means by considering the screen transition, and the output signal from said first counter;

a second counter reset by the clock signal from said video signal detecting means, for counting the clock signal generated when there is the film mode condition generation signal from said video signal detecting means;

a comparing means for comparing the output signal of the second counter with the threshold value defined by the user, which uses the output signal of said first counter; and a flip-flop for receiving the output of said comparing means and outputting the mode generating signal according to the film mode departure signal outputted from said mode converting means by considering the screen transition.

* * * * *